April 8, 1958     F. C. GARTMAN     2,829,463

FISH LURE

Filed April 11, 1955

INVENTOR.
FRANK C. GARTMAN
BY
Cushman, Darby & Cushman
ATTORNEYS

United States Patent Office 2,829,463
Patented Apr. 8, 1958

2,829,463

FISH LURE

Frank C. Gartman, Paradise, Mont.

Application April 11, 1955, Serial No. 500,458

7 Claims. (Cl. 43—42.49)

This invention relates to an improved fish lure.

More particularly, this invention relates to an improved fish lure which will simulate live bait and will therefore attract the attention of fish when towed through the water, as by trolling or casting and retrieving in the well known manner.

It is generally known and understood that the average game fish does not possess strong or perceptive eyesight. For this reason, fishermen frequently design and use trolling or casting bait which wiggle, flutter, or wobble in a manner which will attract the attention and interest of a fish and which will appear, to the fish, to be some living, edible organism.

Many of the lures which have been heretofore proposed have had the leader or the towing line attached to the forward end thereof so that the lure engages in its various motions about a pivot point defined by the attachment of the lure to the towing means. In such lures, the leading end of the lure is forced to follow the general direction of the towing line, and such a course is confining and allows only a limited amount of action at this end of the lure. It will therefore be seen that such a restriction on the overall motion of the lure reduces its movement possibilities potential.

It is within the contemplation of this invention to provide a fish lure which has the line attached at some central point intermediate the longitudinal ends so that the lure will engage in an overall wobbling motion, which gives an improved simulation of live bait. That is to say, both the front or leading end and the rear or trailing end of the lure will wobble or move or swing laterally back and forth.

It is also within the contemplation of this invention to provide such a lure which will also periodically oscillate about an axis or axes which are generally similar to the longitudinal axis of the lure.

It is therefore one object of this invention to provide a fiesh lure which has an overall lateral wobbling motion.

It is another object of this invention to provide a fish lure which will periodically oscillate in a manner which will attract the notice and interest of fish.

It is another object of this invention to provide a device of the character described which is simple in construction, inexpensive to manufacture, and yet effective and efficient in use.

These and other objects of this invention will be fully understood from the following detailed description of a typical preferred form and application of the invention, throughout which description reference is made to the accompanying drawings in which.

Figure 1:
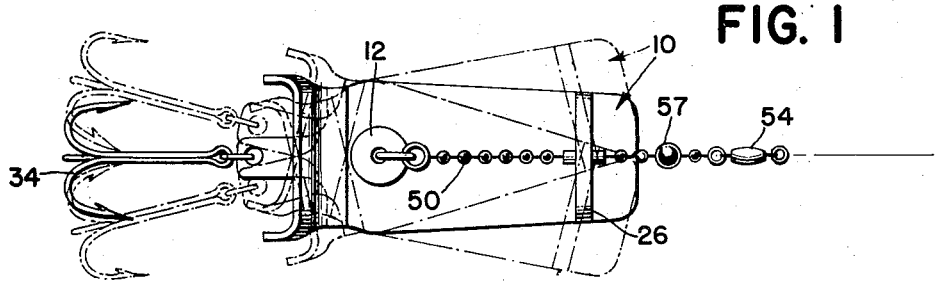
Figure 1 is a top plan view of a fish lure embodying this invention, with various positions thereof assumed in operative use relative to the leader, being illustrated in phantom.

A body portion of a lure embodying this invention is illustrated in the drawings, as an elongated sheet metal plate 10 having aligned bosses 12 and 14 formed or welded on both planar sides thereof at a position intermediate the longitudinal ends thereof and preferably at a substantial distance from the front end 16. For convenience of description, the lure will be considered to move forwardly or towards the front end. The bosses 12 and 14 and the plate 10 have a common hole 18 bored therethrough to define a bearing for a pin 20 which fits loosely therein. The pin is loosely held in position by a large head 22 on one, or lower, end thereof and by an eye 24 formed on a second, or upper, end.

Figure 3:
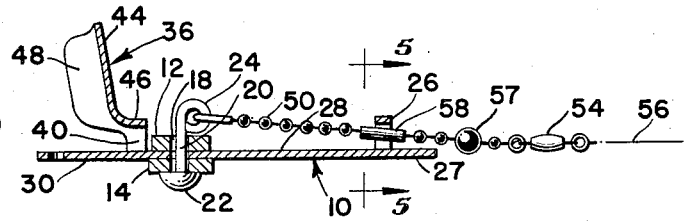
Figure 3 is a sectional view taken along line 3—3 of Figure 2.
Figure 5:
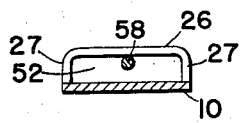
Figure 5 is a sectional view taken along line 5—5 of Figure 3.

A guide bar 26, shaped as an inverted U, has legs 27 extending upwardly from the top surface 28 of plate 10 and has a base which extends laterally across one end of the plate in spaced relation thereto. As best shown in Figures 3 and 5, the guide bar 26, together with the upper surface 28 of the plate 10, defines a leader confining means, as will be described in detail hereinafter.

The plate has a rearwardly extending projection 30 having an aperture therein for receiving a link 32 secured to the eye of a conventional gang hook 34. Intermediate of the projection 30 and the upwardly extending boss 12, a transverse flange, generally indicated at 36, is joined to the plate by legs 38 and 40, which are of substantially the same height as the guide bar 26.

Figure 2:
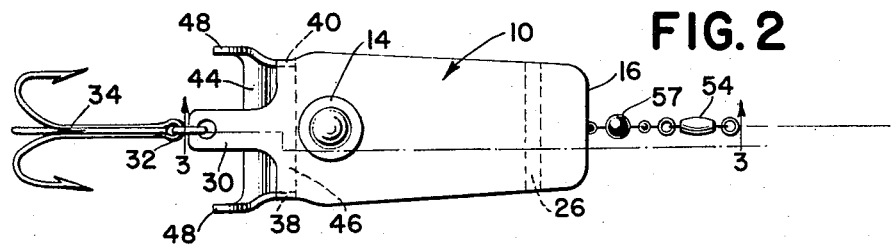
Figure 2 is a bottom plan view of the fish lure shown in Figure 1.
Figure 4:
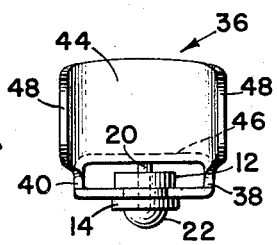
Figure 4 is a rear elevational view of the fish lure shown in Figure 1.

A main portion 44 of the flange 36 is somewhat rearwardly inclined relative to the plate 10. As best shown in Figures 2, 3 and 4, the flange is somewhat wider than the plate 10 and extends upwardly to define a plane which is, in a preferred embodiment, oblique to the plane defined by the upper surface 28 of the plate 10. As best shown in Figure 3, the upwardly extending portion of the flange is somewhat offset rearwardly of the legs 38 and 40 and is joined thereto by a short horizontally extending portion 46 which defines a ledge parallel with the upper surface 28 of the plate 10. As best shown in Figure 4, the ledge 46, the legs 38 and 40, and the upper surface 28 of the plate 10 define an opening which serves to decrease the overall resistance of the lure as it is drawn through the water. Each of the lateral edges of the main portion 44 of flange 36 carries rearwardly projecting ears 48, which are here illustrated as being formed integral with the flange.

A chain leader 50 is attached to the eye 24 of pin 20 and extends forwardly through the opening 52 defined by guide bar 26 and planar surface 28. The free end of the leader is attached to a swivel joint 54 which is, in turn, attached to a casting or trolling line 56 in the usual manner. A large bead 57 may be interposed between the swivel joint 54 and the guide bar 26 to prevent fouling of the leader 50.

While any light chain or line will serve as a satisfactory leader, it is within the contemplation of this invention to use a ball and pin chain, as illustrated in Figure 3, and to provide such a chain with a free turning roller 58 located at the point where the chain passes through opening 52. As will be discussed in detail hereinafter, it is also within the contemplation of this invention that the lure will oscillate about generally longitudinal axes, defined by the leader 50, and such a roller will measurably decrease the wear on the guide bar 26 and the leader 50 caused by the continuing moving contact therebetween.

The above described fish lure will demonstrate new and unusual characteristics when towed through the water as by trolling or by casting and retrieving. When the lure is towed through the water, the line 56 and leader 50 will maintain themselves substantially in a straight line along the direction of movement and the lure will oscillate laterally of the leader about an axis defined by the pin 20.

Referring more particularly to Figure 1, in which the limits of the lateral oscillation are illustrated in phantom, it will be seen that the guide bar acts as a lateral oscillation limiting means inasmuch as the side or leg portions 27 thereof will contact the leader and will prevent further turning of the lure in a given direction. When the lure is retrieved or trolled at a slow rate of speed, the lure will oscillate back and forth, within the limits defined by guide bar 26, as discussed hereinabove, but if the lure is trolled or retrieved at a high rate of speed, the lure will turn or cant to one side and will then be unable to right itself because of the unequal pressures upon the flange 36 which will then be disposed at an angle to the direction of movement or to the direction of water pressure. The lure will therefore effect a spinning or rotational motion, about an axis defined by leader 50. When the lure has completed approximately one-half of a revolution, the position of the flange 36, relative to the water through which it is traveling, will be reversed so that the lure will then laterally oscillate, about an axis defined by pin 20, to an opposite extreme or canted position. Actually, the water pressure on the flange merely operates to center the lure relative to the lead line, that is to say, to bring it to a neutral position, and the momentum of the swing carries the lure to the opposite extreme position. As the lure continues its forward motion, the above mentioned sequence will reverse itself and the lure will revolve back to its original angular position and will then swing transversely through a center position to the first mentioned canted position.

When the lure is spinning or rotating at a high rate of speed, about an axis defined by the leader 50, it would normally take a considerable amount of time for the lure to right itself. The ears 48 of the flange 44 tend to retard the momentum of the spinning action and thus cause the lure to switch back and forth with a reverse spinning action which is considerably faster than would be otherwise possible.

It is within the contemplation of this invention that a guide bar 26 should be laterally dimensioned in such a way that the lure will not swing to one side, as illustrated in Figure 1, over 20° from its center position. If the lure is allowed to swing too far, it will either fail to right itself or will be quite sluggish in doing so.

A successful lure must have a fairly rapid movement or motion if it is to be attractive to fish and it has been found that the relatively rapid lateral oscillation, coupled with a periodic reverse spinning effect, serves to attract the attention and interest of fish in an extremely satisfactory manner.

While it has been hereinabove mentioned that the lure will rotate or spin about an axis defined by the leader 50, it should be here stated that this axis is not fixed relative to the body portion of the lure. Rather, while this axis always extends generally longitudinally of the body portion, it will actually be one of several axes, depending upon the exact disposition of the leader within the opening 52 defined by guide bar 26 and upper planar surface 28. Thus, the generally longitudinal axes, about which the body portion will rotate, will be any of an infinite number of axes defined by the eye 24 of pin 20 and the edges of the opening 52.

Having described only a typical preferred form and application of my invention, I do not wish to be limited or restricted to specific details herein set forth but wish to reserve to myself any variations or modifications that may appear to those skilled in the art and falling within the scope of the following claims.

I claim:

1. In a fish lure adapted to be drawn through water in a longitudinal direction by a leader, the combination comprising a planar body portion; means for securing the leader to said body portion intermediate the longitudinal ends thereof; said body portion being free to experience pivotal motion about said leader securing means; leader confining means for limiting the lateral pivotal motion of said lure about said leader securing means, said leader confining means extending transversely of said body portion and combined therewith to circumscribe the leader when said lure is drawn through the water; flange means extending transversely of said body portion and obliquely away therefrom to cause the lure to laterally pivot about said leader securing means and to rotate about generally longitudinal axes defined by the leader securing means and said leader confining means; the number and location of said axes being limited by said leader; and rotation retarding means fixed to said flange means.

2. In a fish lure adapted to be drawn through water in a longitudinal direction by a leader, the combination comprising a planar body portion; means for securing the leader to said body portion intermediate the longitudinal ends thereof; said body portion being free to experience pivotal motion about said leader securing means; leader confining means for limiting the lateral pivotal motion of said lure about said leader securing means, said leader confining means extending transversely of said body portion and combined therewith to circumscribe the leader when said lure is drawn through the water; flange means extending transversely of said body portion and obliquely away therefrom to cause the lure to laterally pivot about said leader securing means and to rotate about generally longitudinal axes defined by the leader securing means and said leader confining means; the number and location of said axes being limited by said leader; said flange being spaced from said planar body portion; and rotation retarding means fixed to said flange and extending normal thereto.

3. In a fish lure adapted to be drawn through water in a longitudinal direction the combination comprising a longitudinally elongated planar body portion; a leader; means for securing said leader to said body portion intermediate the longitudinal ends thereof; said body portion being free to experience pivotal motion about said leader securing means; leader confining means for limiting the lateral pivotal motion of said lure about said leader securing means, said leader confining means being disposed on the same planar side of said body portion as said leader securing means and forward thereof and being arranged to circumscribe the leader when said lure is drawn through water; flange means extending transversely of said body portion and obliquely away therefrom to cause the lure to laterally pivot about said leader securing means and to rotate about generally longitudinal axes defined by said leader securing means and said leader confining means; the number and location of said axes being limited by said leader; said flange being spaced from said planar body portion; and rotation retarding means fixed to said flange and extending normal thereto.

4. The structure defined in claim 3 in which said leader confining means comprises a U-shaped member having its base portions extending transversely of said planar body portion in spaced relation thereto and having its leg portions secured to said body portion, said confining means and said body portion defining an aperture having a greater width than height.

5. The structure defined in claim 3 in which said flange has a planar ledge extending transversely of said body portion in spaced relation thereto, a plurality of legs joining said ledge to said body portion, said legs being disposed in spaced relation one to the other.

6. The structure defined in claim 3 in which said means for securing said leader comprises a pin extending normal to said body portion through an aperture defined thereby, said pin being loosely rotatably secured to said body portion.

7. In the structure defined in claim 4, said leader extending generally longitudinally of said lure through said leader confining means, roller means fixed to said leader at the point where the leader passes through said leader confining means to prevent chafing therebetween, and means limiting any motion of said leader through the aperture in the direction of said leader securing means.

References Cited in the file of this patent

UNITED STATES PATENTS

| | | |
|---|---|---|
| 631,297 | Greve | Aug. 22, 1899 |
| 1,393,617 | Frame | Oct. 11, 1921 |
| 1,840,273 | Lang | Jan. 5, 1932 |
| 2,008,250 | Haas | July 16, 1935 |
| 2,189,487 | Davenport | Feb. 6, 1940 |
| 2,243,663 | Wareham | May 27, 1941 |
| 2,507,454 | Nelson | May 9, 1950 |
| 2,580,104 | King | Dec. 25, 1951 |
| 2,698,494 | Larsen | Jan. 4, 1954 |